United States Patent [19]
Osmundsen et al.

[11] 3,753,045
[45] Aug. 14, 1973

[54] SHIELDED METAL ENCLOSED LIGHTNING ARRESTER

[75] Inventors: Norman K. Osmundsen; John E. Harder, both of Bloomington, Ind.; Tohei Nitta, Hyogo, Japan

[73] Assignee: Westinghouse Electric Corporation, Pittsburgh, Pa.

[22] Filed: Oct. 11, 1972

[21] Appl. No.: 296,687

[52] U.S. Cl............................. 317/62, 315/36, 317/70
[51] Int. Cl. ............................................. H02h 9/06
[58] Field of Search.......................... 317/62, 61, 70; 315/36

[56] References Cited
UNITED STATES PATENTS

| 3,099,770 | 7/1963 | Sorrow et al. ............... 317/62 X |
| 3,624,450 | 11/1971 | Graybill ........................... 317/62 |
| 3,649,875 | 3/1972 | Nagai et al. ................. 317/70 X |

Primary Examiner—James D. Trammell
Attorney—A. T. Stratton, Grover W. Walters et al.

[57] ABSTRACT

A high voltage lightning arrester enclosed in a grounded metal enclosure containing a pressurized insulating gas. The arrester is provided with capacitance grading means to control the voltage distribution across the arrester.

7 Claims, 3 Drawing Figures

3,753,045

SHIELDED METAL ENCLOSED LIGHTNING ARRESTER

BACKGROUND OF THE INVENTION

The present invention relates to high voltage lightning arresters enclosed in a grounded metal enclosure and insulated by a pressurized gas, and more particularly to means for controlling the voltage distribution across such an arrester.

More generally, the invention relates to high voltage, metal enclosed, gas insulated electrical systems. In such systems the conductors or busses are enclosed in tubular metal enclosures filled with a pressurized gas of suitable properties such as sulphur hexafluouride. Associated devices such as circuit breakers, isolators, grounding switches and the like are also contained in metal enclosures, so that a complete substation, or other electrical system, can be made up of components contained in communicating metal enclosures and insulated by the pressurized gas. Such a system permits a substantial reduction in the space required, as well as increased reliability and safety, and reduced maintenance; with the further advantage that it lends itself well to a modular design approach with resulting low installation costs.

The pressurized gas insulation used in these systems permits relatively close clearances between the grounded metal enclosure and the high voltage equipment contained within the enclosure. When a high voltage, such as the line to ground system voltage, is applied across a device in such close proximity to a grounded surface, however, the electric field is badly distorted and the performance of devices such as lightning arresters is adversely affected by the resulting non-uniformity of voltage distribution. Other devices such as coupling capacitors, for example, may also be adversely affected by non-uniform voltage distribution resulting from a relatively small clearance to adjacent grounded metal surfaces. Lightning arresters have been used in metal enclosures at relatively low voltages, as in Harder U.S. Pat. No. 3,469,146, and have been proposed for high voltage, gas insulated systems, as in Braybill U.S. Pat. No. 3,624,450, but no means for controlling the voltage distribution in such an arrangement has been available except the conventional grading rings. Such grading rings are applied to the line terminal and, for high voltage arresters, they can be of very large size and high cost and do not necessarily result in the desired voltage distribution. Furthermore, they are not desirable for a metal enclosed system because of the large amount of space which they require.

SUMMARY OF THE INVENTION

The present invention provides a means for controlling the voltage distribution across a lightning arrester enclosed in a grounded metal enclosure so as to obtain substantially uniform voltage distribution.

In our copending application Ser. No. 296,720, filed Oct. 11, 1972, and assigned to the assignee of the present invention, there is disclosed a metal enclosed lightning arrester provided with an asymmetrical shielding means for obtaining substantially uniform voltage distribution. The present invention provides a metal enclosed lightning arrester with capacitance grading means for controlling the voltage distribution. In accordance with the invention, a metal enclosed arrester has a series of generally cylindrical shields which are spaced apart axially of the arrester from the line terminal end towards the ground end. Capacitors of progressively decreasing capacitance are disposed within the shields and connected between each two adjacent shields. In this way, the voltages of the successive shields are primarily established by the capacitors which function to provide capacitance grading and control the voltage distribution across the arrester. A very effective means is thus provided for obtaining uniform voltage distribution across the arrester even though it is enclosed within a grounded metal enclosure with relatively small clearance. An arrester of standard design and construction can then be utilized in a metal enclosed, gas insulated system and its performance will be essentially the same as in the more usual outdoor environment because of the effective control of the voltage distribution.

BRIEF DESCRIPTION OF THE DRAWINGS

The invention will be more fully understood from the following detailed description, taken in connection with the accompanying drawings, in which.

DESCRIPTION OF THE PREFERRED EMBODIMENT

Figure 1:
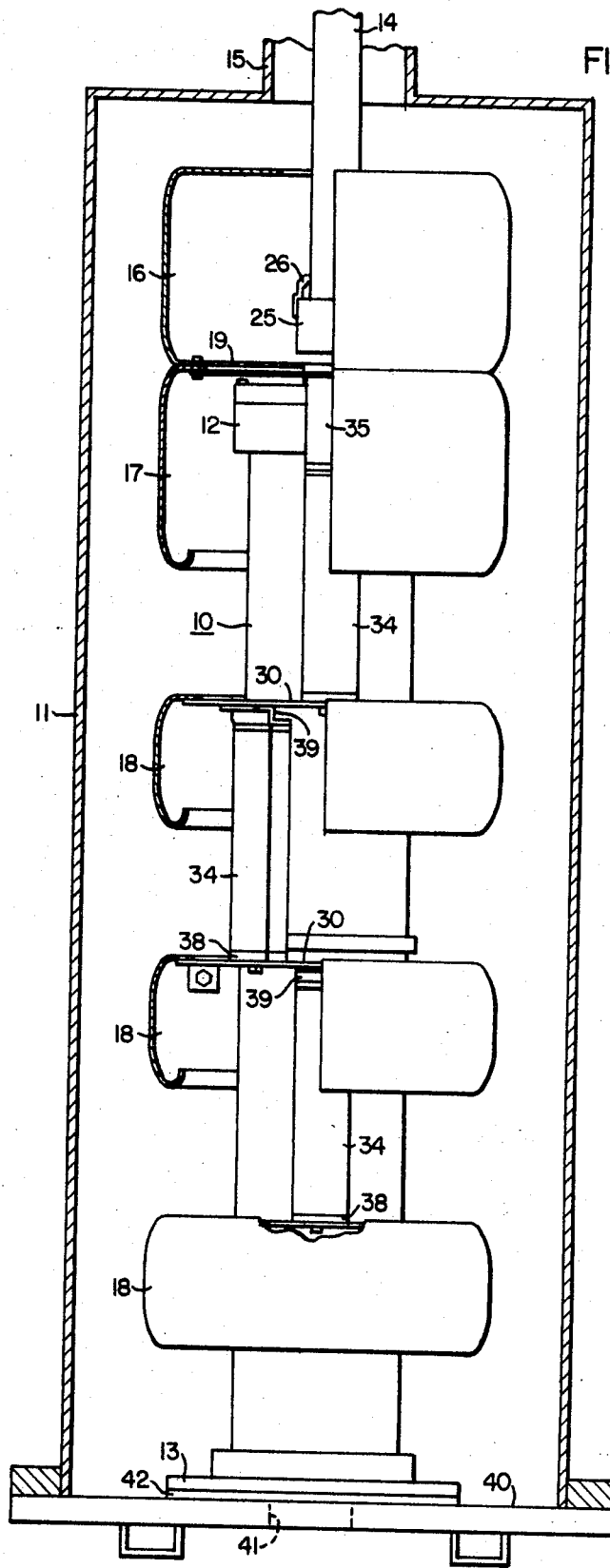
FIG. 1 is a front view in elevation and partially in section showing a capacitance graded metal enclosed lightning arrester embodying the invention.

There is shown in the drawings a capacitance graded, high voltage, metal enclosed lightning arrester embodying the principles of the invention. As there shown, a lightning arrester 10 is disposed within a metal enclosure 11, which would normally be grounded, and which is generally cylindrical to enclose the arrester 10 with a clearance between the enclosure and the arrester. The enclosure 11 is filled with a suitable insulating gas such as sulphur hexafluoride at a pressure of 45 psig, although other suitable gases or pressures might be used. The pressurized gas insulation makes possible a relatively small clearance between the enclosure and the arrester and thus reduces the space required for the installation. It will be understood that the metal enclosed, gas insulated systems to which the invention relates are primarily intended for use in substations on high voltage transmission systems. Thus, these gas insulated systems have been designed for voltages in the range of 69 KV to 345 KV, for example, although they may obviously be used for other voltages. At these high voltages the saving in space due to the reduced clearances is very significant. The relatively small clearnces to ground, however, result in the problem of non-uniform voltage distribution mentioned above which would adversely affect the performance of lightning arresters, and certain other devices such as coupling capacitors.

The arrester 10 has not been illustrated in detail and it may be any standard or conventional type of high voltage lightning arrester consisting of a suitable assembly of spark gaps and valve blocks. A suitable construction and arrangement is shown, for example, in the patents to Kennon U.S. Pat. No. 3,534,221 and Osterhout et al. U.S. Pat. No. 3,611,044 although any suitable construction might be utilized. The arrester 10 is contained in a generally cylindrcal housing of porcelain or other suitable insulating material and which may have a smooth exterior surface. The arrester is closed and sealed by a metal end cap 12 at the upper end which serves for connection to a line terminal, and by a metal end cap 13 at the bottom for connection to ground. A line conductor 14 which may be a rod-like member, either solid or tubular, is connected to the end cap 12 as more fully described hereinafter for connection to the equipment to be protected by the arrester. The conductor 14 is contained in a tubular metal enclosure 15 which communicates with the enclosure 11 and forms part of a complete metal enclosed substation or other electrical system.

In the conventional use of a lightning arrester such as the arrester 10, it is supported on a substation structure or platform support, or other grounded supporting structure of some type, usually in the open air. The voltage distribution across the arrester is then substantially uniform, or can be made sufficiently uniform by conventional grading rings, and the performance of the arrester is determined on that basis. In the usual outdoor installation, the voltage distribution may be affected by stray capacitances to ground but most of the arrester is sufficiently remote from the grounded supporting structure that these capacitances are relatively small and do not seriously affect the voltage distribution. When the arrester is enclosed in a metal enclosure 11 as in FIG. 1, however, the presence of a grounded conducting surface in close proximity to the arrester over its entire length has a serious effect on the voltage distribution if no means are provided to control it. The clearance between the enclosure 11 and the arrester 10 is necessarily relatively small in order to obtain the advantages of the metal enclosed system discussed above, and the capacitances to ground between the arrester and the enclosure are therefore relatively large, so that the electric field is seriously distorted. The performance of a standard arrester would be adversely affected by the resulting non-uniformity of voltage distribution.

Figure 3:
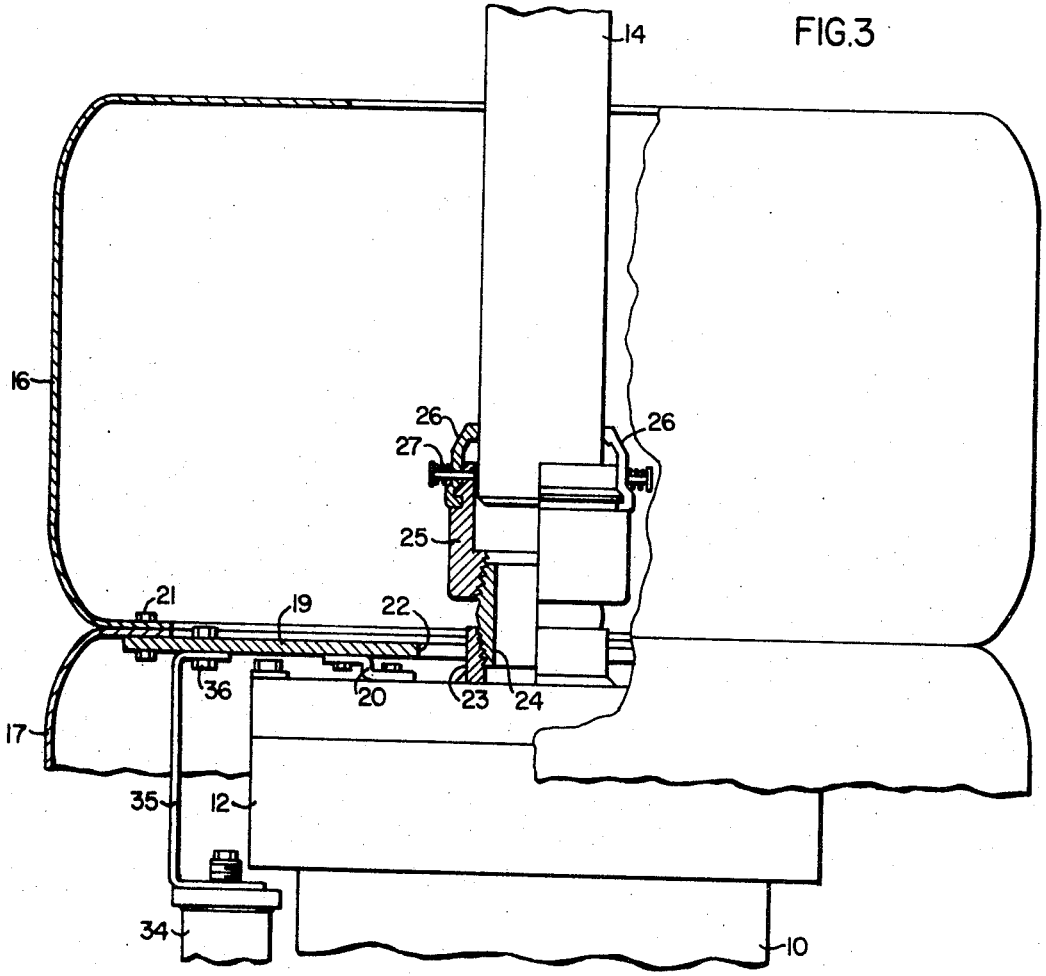
FIG. 3 is a fragmentary elevation view of the line terminal and upper end of the arrester, partially in section.

In accordance with the present invention, there is provided a capacitance grading arrangement to control the voltage distribution across the arrester in a manner to make possible a substantially uniform voltage distribution and thus permit the satisfactory use of a high voltage arrester of standard design. As shown in the drawings, the arrester 10 is provided with a series of generally circular shields including shields 16 and 17 encircling the line terminal means and top of the arrester and a plurality of shields 18 spaced apart along the axial length of the arrester. At the top of the arrester, as shown particularly in FIG. 3, a circular metal plate 19 is mounted on the upper end cap 12 by means of brackets 20 of any suitable type to be mechanically supported on the end cap 12 and electrically connected thereto. The shields 16 and 17 are mounted on the plate 19, as by screws 21, and extend upwardly and downwardly, respectively, from the plate 19 to encircle the upper end cap and the terminal means.

The plate 19 has a central opening 22 substantially concentric with the axis of the arrester and the line terminal means extends through this opening. Any suitable terminal means may be provided for connecting the line conductor 14 to the arrester 10. As shown in detail in FIG. 3, the particular construction utilized in the present arrester includes an internally threaded boss 23 on the end cap 12 and preferably integral therewith. A connecting sleeve 24 is threaded into the boss 23 and a generally cylindrical contact member 25 is threaded on the sleeve 24. The contact member 25 may be a cylindrical steel member internally threaded at one end to engage the sleeve 24. At the other end a plurality of contact fingers 26 are pivotally mounted on the contact member 25 and urged radially inwardly by means of springs 27, the contact fingers 26 being movable to the necessary extent in radial slot in the member 25. The conductor 14 engages the spring loaded contact fingers 26 to effect connection to the arrester, thus providing a simple, easily engaged connecting means.

Figure 2:
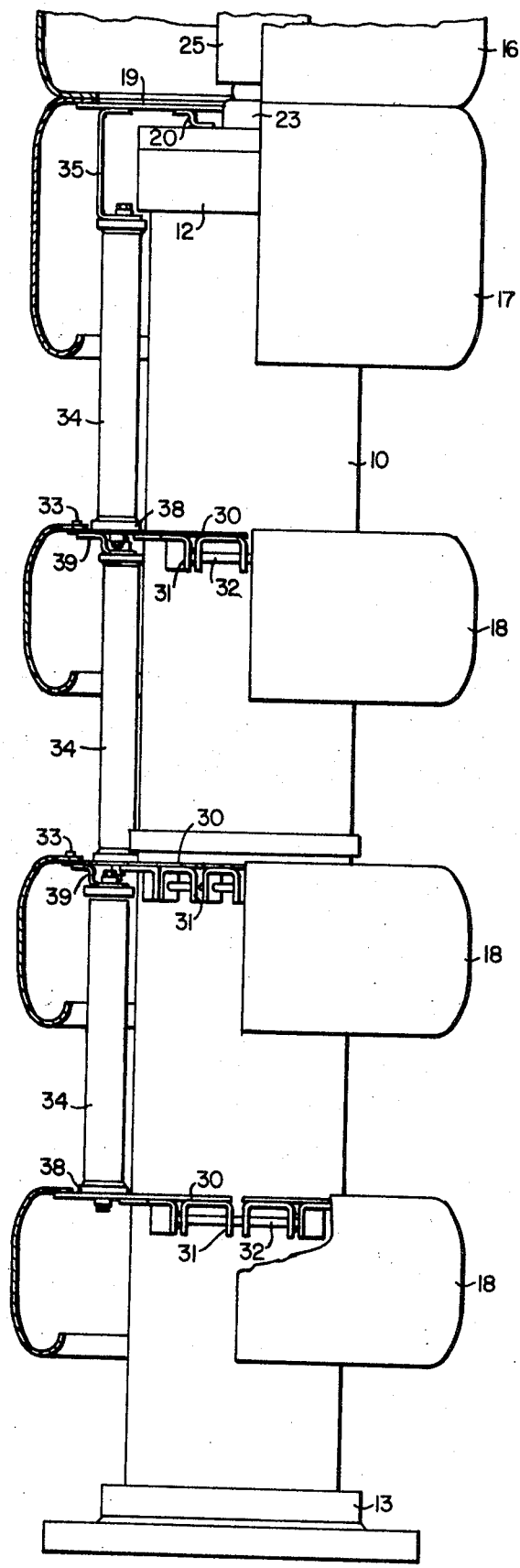
FIG. 2 is a side view of the arrester.

As shown in FIGS. 1 and 2, the shields 16, 17 and 18 may be made from sheet metal, or other suitable conducting material, and are generally cylindrical preferably with rolled edges as shown. The uppermost shield 17 encircles the end cap 12 and is supported thereon and connected thereto as described above. The line terminal shield 16 which is preferably also provided extends upwardly to encircle the line terminal means. The remaining shields 18 are shorter in axial height and are spaced apart axially of the arrester as shown, the spacing between shields being made great enough to avoid any risk of flashover between the shields under any expected operating conditions. The shields 18 are supported on annular members 30 which may be in the form of split rings or semicircles extending around the arrester 10 at the desired locations and clamped tightly in place on the arrester by clamp members 31 and bolts 32. The shields 18 are mounted on the rings 30 by means of screws 33 or in any desired manner.

To obtain the desired capacitance grading the voltages of the shields are established by means of capacitors 34. Four shields 17 and 18 are utilized in the illustrated embodiment and three capacitors 34 are provided, with each capacitor connected between two adjacent shields, although any necessary desired number of shields and capacitors could of course be used. The uppermost capacitor 34 is connected to and mechanically supported by a bracket 35 which is attached to plate 19 by a screw 36. The lower end of the uppermost capacitor engages the uppermost ring 30 and is attached and electrically connected thereto by a base 38 secured to the ring 30. Each of the other two capacitors 34 is similarly attached at its bottom by a base 38 to a ring 30 and at its top by a bracket member 39 to the adjacent ring 30. Thus the capacitors are electrically connected between each two adjacent shields, and are physically disposed inside the shields and extend along the outer surface of the arrester 10 as shown in the drawings. Although a single capacitor has been shown between each two shields, two or more capacitors could be used connected in any decided series or parallel connection.

As previously mentioned, if the arrester 10 were merely placed in a grounded metal enclosure in the manner shown in FIG. 1, the voltage to ground at any point along the arrester would be largely determined by the capacitance to ground (the enclosure 11) at that point. In the absence of any means for controlling the voltage distribution, this would result in a very distorted electric field and an extremely non-uniform voltage distribution across the arrester. The capacitance grading means of the present invention, however, utilizes capacitors 36 of appropriate capacitance to determine the voltages of the shields 18 so as to obtain the desired distribution of voltage along the arrester. The uppermost shield 17 is at line potential and the successive capacitors 34 are chosen to progressively decrease in capacitance to obtain the desired potential for each of the shields 18. Thus by proper design and by proper choice of the capacitors the distribution of voltage along the arrester can be made substantially uniform, or, if desired, any other voltage distribution might be obtained by selecting capacitors such that the potentials of the successive shields have the desired values. Thus the adverse effects of the grounded surface 11 in close proximity to the arrester are overcome, and an arrester 10 of standard or conventional design can be utilized and its performance will be essentially the same as in the usual outdoor environment.

As previously indicated, the bottom end cap 13 may be utilized as a ground terminal for the arrester. The enclosure 11 is of course grounded and the arresters is mounted on the enclosure 11 with the end cap 13 electrically connected thereto.

The arrester 10 may as previously indicated be of any suitable or usual construction. Many arresters are provided with pressure release diaphragms or blow-out plates of various types at the lower end to permit the escape of gases which may be generated within the arrester in case of failure, so as to prevent the risk of explosion of the arrester and damage to other equipment. When an arrester provided with a pressure release means of this kind is utilized in the present invention, it is desirable to prevent contamination of the pressurized insulating gas in the enclosure 11 by the gases escaping from the arrester, and it is also desirable to maintain the integrity of the sealed enclosure to prevent escape of the insulating gas or loss of pressure in the closed system. The arrester of the present invention is therefore mounted in the enclosure 11 in a manner to accomplish these purposes. As shown in FIG. 1, the bottom plate 40 which forms the bottom wall of the enclosure 11 has a central opening 41. The arrester 10 is placed on the plate 40 in such a position that its axis is concentric with the opening 41 so that in case of failure of the arrester and release of gas from the interior of the arrester, it can escape through the opening 41. A sealing gasket 42 is placed between the bottom end cap 13 of the arrester and the plate 40 with a central opening coextensive with the opening 41. The arrester 10 may be held in place by suitable mounting bolts or other means which will effect electrical connection to the plate 40. It will be seen that the gasket 42 effectively seals the arrester to the bottom plate 40 of the enclosure, so that if the arrester should fail in service and the pressure release device should operate to permit the escape of gases generated in the arrester, the gases can escape through the opening 41 without contaminating the pressurized insulating gas in the enclosure 11 and without causing any loss of pressure or escape of gas from the sealed enclosure. It will be understood that any suitable sealing and mounting means may be utilized to mount the arrester 10 on the bottom plate 40.

It should now be apparent that a capacitance grading arrangement has been provided for lightning arresters which makes it possible to obtain uniform voltage distribution across a high voltage arrester enclosed in a grounded metal enclosure. This makes it possible to use arresters of standard or conventional design in a metal enclosed, gas insulated system with the same performance as in the more usual outdoor environment despite the presence of a grounded surface in close proximity to the arrester over its entire length. This is obtained by the arrangement of grading capacitors with shields encircling the arrester and maintained at the desired potential by the capacitors, thus ensuring the desired distribution of voltage. The particular construction disclosed is a particularly desirable arrangement for facilitating the design and manufacture of this type of graded arrester but it will be apparent that other specific details of construction might be utilized.

What is claimed is:

1. In combination, a grounded metal enclosure containing an insulating gas, a lightning arrester disposed within said enclosure, said arrester having line terminal means at one end thereof and ground terminal means at the other end, a plurality of conducting shields encircling the arrester and spaced apart axially of the arrester, one of said shields encircling said line terminal means and being electrically connected thereto, and a capacitor connected between each two adjacent shields.

2. The combination of claim 1 in which said capacitors extend axially along one side of the arrester within the shields.

3. The combination of claim 1 in which said capacitors have different capacitances to establish a desired distribution of voltage across the arrester.

4. The combination of claim 1 in which said capacitors progressively decrease in capacitance from the line terminal end of the arrester to establish a uniform distribution of voltage across the arrester.

5. The combination of claim 1 in which said line terminal means includes means for effecting electrical connection to an external conductor, a conductive plate member in conductive relation to the terminal means, the uppermost one of said shields being attached to said plate member, and means for connecting the uppermost one of said capacitors to the plate member.

6. The combination of claim 1 in which a plurality of circular members are clamped around the arrester in spaced positions, said one shield being supported from the line terminal means, means for mounting each of the other shields on one of said circular members, and means for connecting said capacitors to the adjacent circular members.

7. The combination of claim 1 in which said ground terminal means includes a conducting bottom cap having a central opening therein, and means for attaching said cap to the metal enclosure with a sealed connection, the enclosure having an opening adjacent said opening in the cap and within the sealed connection.

* * * * *